US 10,425,640 B2
(12) United States Patent
Wang et al.

(10) Patent No.: US 10,425,640 B2
(45) Date of Patent: Sep. 24, 2019

(54) METHOD, DEVICE, AND ENCODER FOR CONTROLLING FILTERING OF INTRA-FRAME PREDICTION REFERENCE PIXEL POINT

(71) Applicant: Peking University Shenzhen Graduate School, Shenzhen (CN)

(72) Inventors: Ronggang Wang, Shenzhen (CN); Kui Fan, Shenzhen (CN); Zhenyu Wang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 0 days.

(21) Appl. No.: 15/765,304

(22) PCT Filed: Jun. 16, 2016

(86) PCT No.: PCT/CN2016/085974
§ 371 (c)(1),
(2) Date: Apr. 2, 2018

(87) PCT Pub. No.: WO2017/214920
PCT Pub. Date: Dec. 21, 2017

(65) Prior Publication Data
US 2019/0098303 A1 Mar. 28, 2019

(51) Int. Cl.
*H04N 19/117* (2014.01)
*H04N 19/593* (2014.01)
*H04N 19/105* (2014.01)
*H04N 19/176* (2014.01)
*H04N 19/14* (2014.01)
*H04N 19/86* (2014.01)

(52) U.S. Cl.
CPC ......... *H04N 19/117* (2014.11); *H04N 19/105* (2014.11); *H04N 19/14* (2014.11); *H04N 19/176* (2014.11); *H04N 19/593* (2014.11); *H04N 19/86* (2014.11)

(58) Field of Classification Search
CPC .................. H04N 19/0089; H04N 19/00909
USPC ...................................... 375/240.25–240.29
See application file for complete search history.

(56) References Cited

U.S. PATENT DOCUMENTS

2015/0016550 A1* 1/2015 Kim ................... H04N 19/80
375/240.29

* cited by examiner

*Primary Examiner* — Anand S Rao
(74) *Attorney, Agent, or Firm* — SV Patent Service

(57) ABSTRACT

A method, a device and an encoder for controlling filtering of intra-frame prediction reference pixel point are disclosed. The method includes: when various reference pixel points in a reference pixel group of an intra-frame block to be predicted are filtered, and the target reference pixel point to be filtered currently is not an edge reference pixel point in a reference pixel group (S202), acquiring a pixel difference value between the target reference pixel point and n adjacent reference pixel points thereof (S203); and selecting a filter with the filtering grade thereof corresponding to the pixel difference value to filter the target reference pixel point (S204). For various reference pixel points not located at an edge in a reference pixel group, according to the local difference characteristics of these reference pixel points, filters with corresponding filtering grades are flexibly configured, thus providing flexibility and adaptivity to the filtering, achieving better effect.

9 Claims, 5 Drawing Sheets

| I | J | K | L | M | N | P | Q | R |
|---|---|---|---|---|---|---|---|---|
| H | | | | | | | | |
| G | | | | | | | | |
| F | | | | | | | | |
| E | | | | | | | | |
| D | | | | | | | | |
| C | | | | | | | | |
| B | | | | | | | | |
| A | | | | | | | | |

Figure 1

METHOD, DEVICE, AND ENCODER FOR CONTROLLING FILTERING OF INTRA-FRAME PREDICTION REFERENCE PIXEL POINT

TECHNICAL FIELD

The present invention relates to the field of video/image encoding and decoding, and specifically, to a method, a device, and an encoder for controlling filtering of intra-frame prediction reference pixel point

BACKGROUND OF THE INVENTION

As people demand more on video/image resolution, video/image contents occupy more and more data transmission bandwidth and storage capacity. How to further increase the video/image compression ratio has become a serious challenge. Especially in intra-frame video/image encoding, the compression efficiency cannot be effectively improved due to lack of inter-frame image reference.

In intra-frame video/Image encoding, intra-frame prediction is adopted to remove redundant spatial information. Before performing intra-frame prediction, the reference pixel points of an intra-frame block to be predicted need to be filtered to eliminate the step effect in the reference pixels. The step in the reference pixel points will lead to a significant directional boundary in the intra-frame block to be predicted, affecting the efficiency and effect of the intra-frame prediction.

At present, the following methods are used for the intra-frame reference pixel points:

Conducting weak filtering on reference pixel points by using a filter with a length of 3 (i.e., a 3-tap filter) and the filter coefficient of [¼, 2/4, ¼], which can only remove small step and noise in the reference pixel points;

The pixel value of each reference pixel point is linearly interpolated by using the pixel value of reference pixel points at the outermost edge (i.e. edge reference pixel points). In this way, the reference pixel values are greatly modified. Therefore, at present, this method only applies to cases where the overall reference pixel points are very flat.

Another way is to combine the above two methods, that is, to determine to use a weak filter with a length of 3 (i.e., a 3-tap filter) and the filter coefficient of [¼, 2/4, ¼] or a linear interpolation filter for filtering of various reference pixel points in a reference pixel group of an intra-frame block to be predicted according to the overall flatness of the reference pixel points (the degree of flatness is determined by the difference between the end edge reference pixel points in a reference pixel group). No matter which method is selected, the reference pixel points in a reference pixel group are uniformly filtered by the selected filtering method, that is, the filtering grades for the reference pixel points in a reference pixel group are identical.

It can be seen from the above analysis that, in the current intra-frame video/image encoding process, the adaptive mechanism of filtering processing of various reference pixel points in a reference pixel group of an intra-frame block to be predicted is too simple. The reference pixel points in a reference pixel group are uniformly filtered by using a fixed filtering grade, resulting in poor filtering flexibility, filtering adaptivity and filtering effect for the intra-frame reference pixel points.

SUMMARY OF THE INVENTION

The present invention provides a method, a device, and an encoder for controlling filtering of an intra-frame prediction reference pixel point, which solves the problem of poor filtering flexibility, filtering adaptivity and filtering effect for the intra-frame reference pixel points in a reference pixel group while the reference pixel points are uniformly filtered by using a fixed filtering grade.

According to an aspect of the present invention, the invention provides a method for controlling filtering of an intra-frame prediction reference pixel point, which includes the following steps:

in a reference pixel group of an intra-frame block to be predicted, when the target reference pixel point to be filtered currently is not an edge reference pixel point in a reference pixel group, acquiring a pixel difference value between the target reference pixel point and n adjacent reference pixel points thereof, the n is greater than or equal to 1; and selecting a filter with the filtering grade thereof corresponding to the pixel difference value to filter the target reference pixel point.

According to a further aspect of the present invention, the invention further provides a device for controlling filtering of an intra-frame prediction reference pixel point, which includes:

a difference value acquiring module that acquires a pixel difference value between the target reference pixel point and n adjacent reference pixel points thereof, wherein n is greater than or equal to 1, in a reference pixel group of an intra-frame block to be predicted, when the target reference pixel point to be filtered currently is not an edge reference pixel point in a reference pixel group; and a filtering control module that selects a filter with the filtering grade thereof corresponding to the pixel difference value to filter the target reference pixel point.

According to a third aspect of the present invention, the invention further provides an encoder, comprising the device for controlling filtering of an intra-frame prediction reference pixel point.

The presently disclosed a system, a method, and an encoder can include one or more of the following advantages. The present invention provides a method, a device, and an encoder for controlling filtering of an intra-frame prediction reference pixel point. When various reference pixel points in a reference pixel group of an intra-frame block to be predicted are filtered, and if the target reference pixel point to be filtered currently is not an edge reference pixel point in a reference pixel group, a pixel difference value between the target reference pixel point and n adjacent reference pixel points thereof is acquired (i.e. the local difference characteristics of the target reference pixel point is acquired); and then a filter with the filtering grade thereof corresponding to the obtained pixel difference value is selected to filter the target reference pixel point. That is, in the present invention, for various non-edge reference pixel points in a reference pixel group, according to the local difference characteristics of these reference pixel points, filters with corresponding filtering grades are flexibly configured, instead of uniformly using filters with a fixed filtering grade. Thus, the filtering flexibility, the filtering adaptivity and the filtering effect are better.

BRIEF DESCRIPTION OF THE DRAWINGS

FIG. 1 illustrates a schematic view of an intra-frame block to be predicted and a reference pixel group according to Embodiment 1 in the present invention.

DETAILED DESCRIPTION OF THE INVENTION

Figure 2:
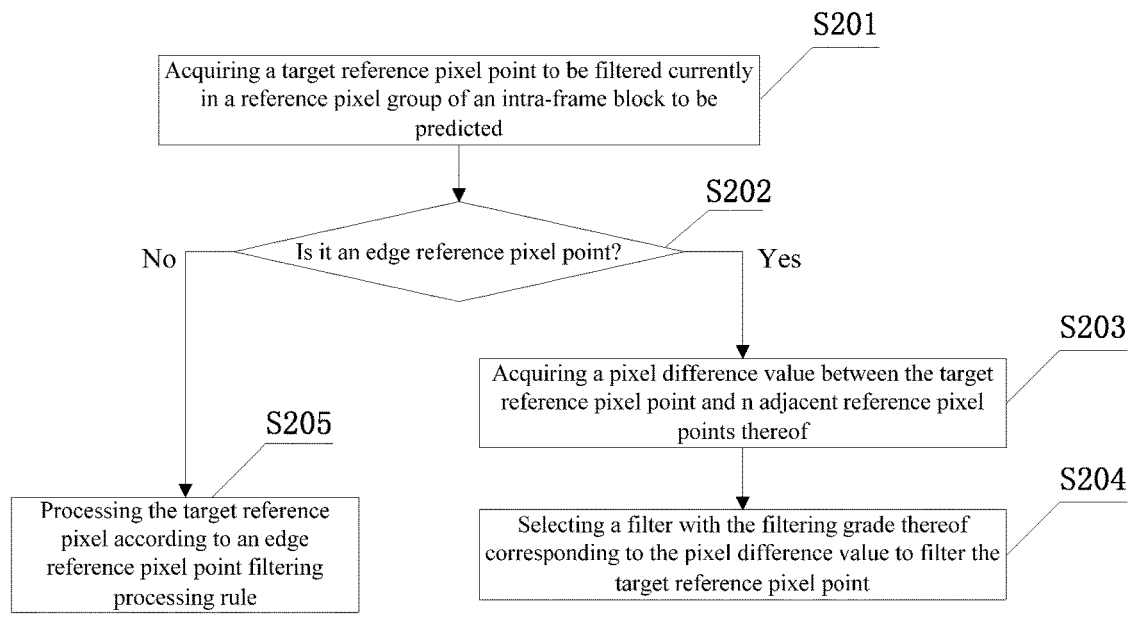
FIG. 2 is a flowchart for a method, a device, and an encoder according to Embodiment 1 in the present invention.

The technical solutions in the embodiments of the present invention will be described clearly and completely hereinafter with reference to the accompanying drawings in the embodiments of the present invention. Apparently, the described embodiments are merely some embodiments in the present invention, but not all of the embodiments. According to the embodiments in the present invention, all other embodiments obtained by those skilled in the field without creative efforts shall fall within the protection scope of the present invention.

Embodiment 1

It should be noted that, the method, the device, and the encoder for controlling filtering of an intra-frame prediction reference pixel point provided in the present invention may be applied to intra-frame image encoding as well as intra-frame video encoding.

Figure 1:
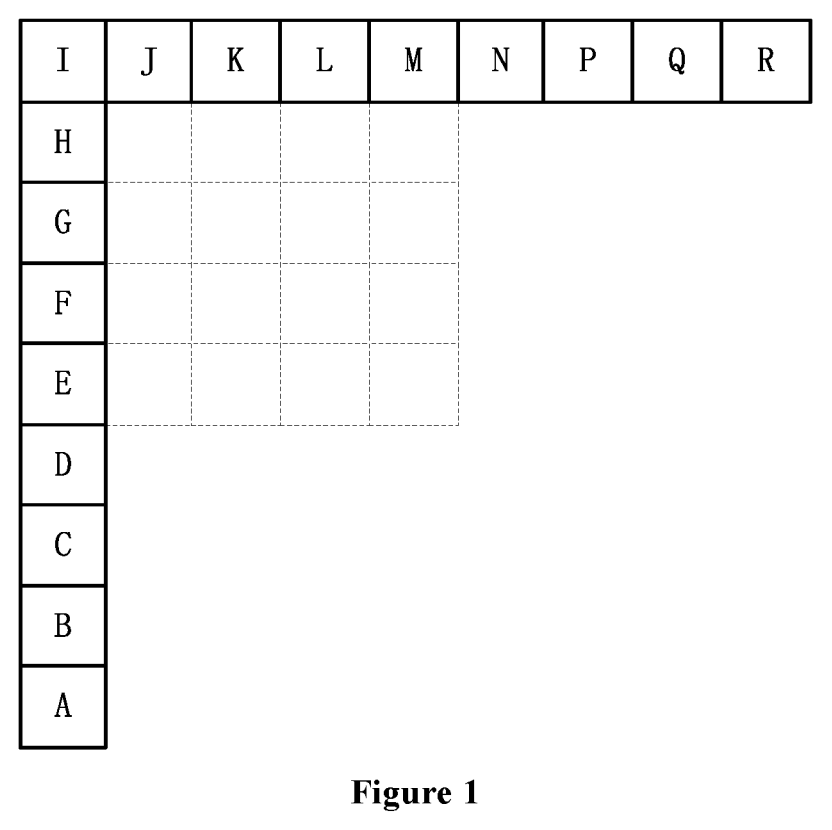

In order to facilitate the understanding of the present invention, some concepts related to the present invention are illustrated in this embodiment with reference to FIG. 1.

In video/image encoding, videos/images are commonly divided into two kinds: intra-frame images and inter-frame images, wherein the intra-frame image encoding uses only the information provided by the image itself for spatial prediction, and its encoding/decoding does not depend on other images; the inter-frame image encoding eliminates the redundant information in the time domain, and its encoding/decoding can rely on one or more of its previous images.

In intra-frame image encoding, the intra-frame image may be divided into a plurality of original data blocks according to a certain rule. For example, it can be divided into m*m original data blocks, and one original data block is an intra-frame block to be predicted. A reference pixel group is set for each intra-frame block to be predicted. Referring to FIG. 1, the matrix block shown by dotted lines in FIG. 1 is an intra-frame block to be predicted. The various reference pixel points above and to the left of the intra-frame block to be predicted form a reference pixel group of the intra-frame block to be predicted, where A, B, C, D, E, . . . , R is the pixel value of each pixel point. According to this embodiment, the reference pixel group includes various edge reference pixel points, wherein the edge reference pixel points may further include end edge reference pixel points and secondary edge reference pixel points. The secondary edge reference pixel points are reference pixel points adjacent to an end edge reference pixel point. In the reference pixel group shown in FIG. 1, the three reference pixel points with pixel value A, I and R are end edge reference pixel points, because there is no reference pixel point adjacent to these pixel points in one direction; the four reference pixel points with pixel value B, H, J and Q are secondary edge reference pixel points.

It should be understood that, the division of the intra-frame blocks to be predicted in the frame image and the specific manner of setting reference pixel groups for each intra-frame block to be predicted are not the focus of the present invention. There is no limitation on the division of the intra-frame blocks to be predicted and the setting of reference pixel groups for each intra-frame block to be predicted in the present invention. The intra-frame block to be predicted and the reference pixel group shown in FIG. 1 are merely exemplary descriptions for facilitating understanding of the present invention.

Referring to FIG. 2, the method for controlling filtering of an intra-frame prediction reference pixel point provided in this embodiment comprises the following steps of:

S201: an a acquiring target reference pixel point to be filtered currently in a reference pixel group of an intra-frame block to be predicted.

S202: judging whether the target reference pixel point is an edge reference pixel point in a reference pixel group; if not, go to Step S203; otherwise, go to Step S205.

In this step, the judging rule of edge pixel points may be determined according to the storage rule of various reference pixel points in a reference pixel group or by further combining the latitude m of the intra-frame block to be predicted. For example, when various reference pixel points in a reference pixel group are stored, the subscripts may be sequentially arranged correspondingly, and it may be determined according to the subscripts of various target pixel points combining m.

S203: acquiring a pixel difference value between the target reference pixel point and n adjacent reference pixel points thereof, wherein n is greater than or equal to 1.

S204: selecting a filter with the filtering grade thereof corresponding to the pixel difference value obtained in Step S203 to filter the target reference pixel point. That is, in the present embodiment, for various non-edge reference pixel points in a reference pixel group, according to the local difference characteristics of these reference pixel points, filters with corresponding filtering grades are flexibly configured, instead of uniformly using filters with a fixed filtering grade. Thus the filtering flexibility, the filtering adaptivity and the filtering effect are better, and S205: processing the target reference pixel point according to the edge reference pixel point filtering rule.

In Step S203, the value of n may be flexibly selected according to actual application requirements. For example, the value of n may be set as 1, and at this time, you can select to calculate the pixel difference value between the target reference pixel point and any one adjacent reference pixel point or any adjacent reference pixel point in any designated direction. Preferably, the value of n is an even number, such as 2 or 4, to calculate pixel difference values between the target reference pixel point and any left/right (or up/down) 2 adjacent reference pixel points or 4 adjacent reference pixel points.

In this step, the following method may be adopted for acquiring a pixel difference value between the target reference pixel point and n adjacent reference pixel points thereof:

Obtain a sum h1 of pixel values of n pixel points and obtain a product h2 of a pixel value of the target reference pixel point and n;

Take the absolute value Diffy of the difference between h1 and h2 as the pixel difference value.

For example, it is assumed that the target reference pixel point currently to be filtered is the pixel point with a pixel value N in FIG. 1.

When n takes 1, and the reference pixel points are taken as the pixel points with a pixel value M, then:

Diffy=abs($h1-h2$)=abs($M-N$).

When n takes 2, and the reference pixel points are taken as the pixel points with pixel value M and P, then:

Diffy=abs($h1-h2$)=abs($M+P-2*N$).

When n takes 4, and the reference pixel points are taken as the pixel points with pixel value L, M and P, Q, then:

Diffy=abs($h1-h2$)=abs($L+M+P+Q-4*N$).

n may take other values and so on, which will not be described again here.

In Step S204, a filter with the filtering grade thereof corresponding to the pixel difference value can be selected according to the following rules:

when the pixel difference value is less than the preset threshold of the weak step pixel difference value, it indicates that the pixel points have only weak step effect, and the filter with the first filtering grade is selected; the filter with the first filtering grade has a length equal to 3 and is mainly used for removing smaller steps and noise in the reference pixel, and this embodiment may be referred to as a weak filtering grade;

when the pixel difference value is greater than the preset threshold of the strong step pixel difference value, it indicates that the vicinity of the pixel points is a real boundary, and thus the filter with the first filtering grade is selected; and the filter with the first filtering grade has a length equal to 3; and when the pixel difference value is greater than or equal to the preset threshold of the weak step pixel difference value and less than or equal to the preset threshold of the strong step pixel difference value, it indicates that the pixel points have a strong step effect and the pixel points are not near the real boundary, so the filter with the second filtering grade is selected. The filter with the second filtering grade has a length greater than or equal to 5. The filtering grade is higher than that of the filter with the first filtering grade, corresponding to the strong filtering grade in this embodiment.

Figure 4:
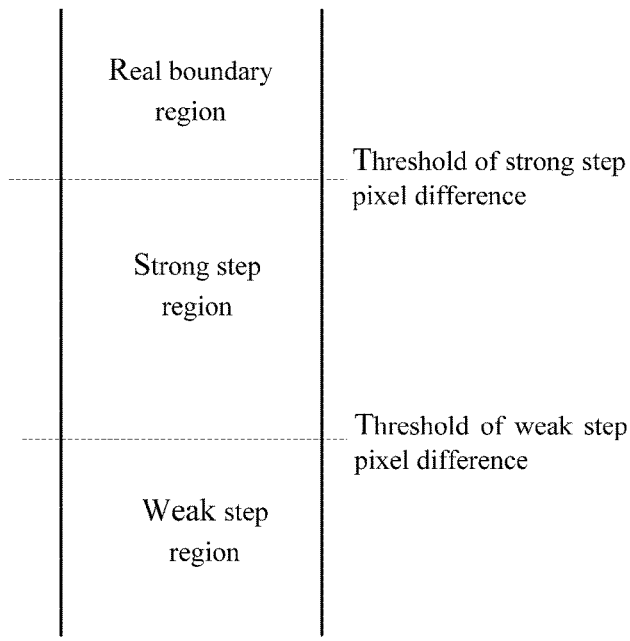
FIG. 4 is a schematic view of setting pixel difference thresholds according to Embodiment 1 in the present invention.

That is, in this embodiment, the step effect can be divided into a weak step region, a strong step region and a real boundary region (FIG. 4) to a certain extent by using the preset threshold of weak step pixel difference and the preset threshold of strong step pixel difference. For each reference pixel points in various regions, filters with the corresponding filtering grades may be selected according to the above rule.

It should be understood that, in this embodiment, the weak step region and the strong step region can further be divided into multiple levels according to actual requirements by setting multiple levels of weak step pixel difference thresholds or strong step pixel difference thresholds, corresponding to filters with multiple filtering grades, which will not be described again here.

According to this embodiment, the filter with the first filtering grade has a length equal to 3. However, it should be understood that the length of the filter with the first filtering grade may be set flexibly according to the needs of a specific application scenario, such as the latitude m of the intra-frame block to be predicted and other factors. According to this embodiment, the filter coefficient of filter with the first filtering grade may also be set flexibly according to require-ments. For example, it may be set as [¼, 2/4, ¼], and it may also be flexibly adjusted to [⅙, 2/6, ⅙] or other values.

According to this embodiment, the length of the filter with the second filtering grade may also be flexibly selected according to such factors as the latitude m of the intra-frame block to be predicted. For example, it can be set as 5, 7 or 9. The following is an example in which the length of the filter with the second filtering grade is equal to 5. In this case, the filter coefficients of the filter with the second filtering grade can be set as [2/16, 3/16, 6/16, 3/16, 2/16]. However, the filter coefficients thereof can also be flexibly adjusted, such as [2/18, 3/18, 6/18, 3/18, 2/18].

Figure 3:
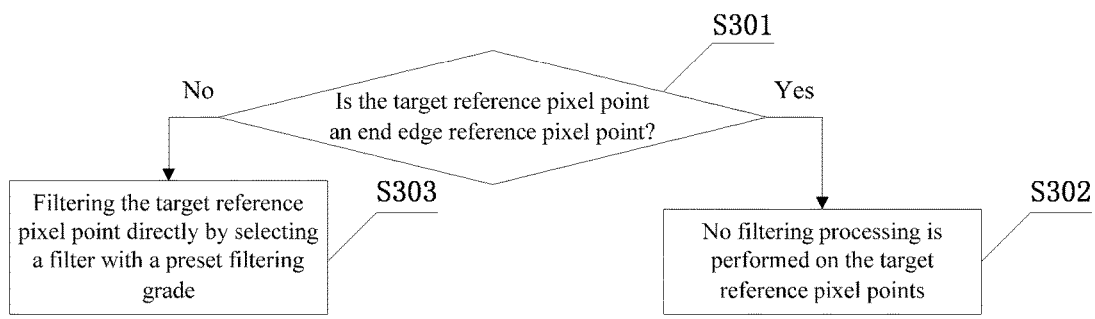
FIG. 3 is a flowchart for controlling filtering processing of edge reference pixel point according to Embodiment 1 in the present invention.

There is no adjacent reference pixel point in one direction of the end edge reference pixel points in the edge reference pixels. There is only one adjacent end edge reference pixel point in one direction of the secondary edge reference pixel point. Therefore, according to this embodiment, the target reference pixel point that is not an edge reference pixel point is processed according to the filtering processing rule shown in FIG. 3.

S301: Is the target reference pixel point an end edge reference pixel point in the edge reference pixels? if not, go to Step S302; otherwise, go to Step S303.

S302: No filtering processing is performed on the target reference pixel point.

S303: Filter the target reference pixel point directly by selecting a filter with a preset filtering grade.

The filter of the preset filtering grade in Step S303 is preferably a filter with weak filtering grade to remove the smaller step and noise in the reference pixel points without using a filter with strong filtering grade. According to the embodiment, the filter with the weak filtering grade may be the filter with the first filtering grade.

According to the embodiment, in the intra-frame encoding prediction process, the local difference characteristic of the pixel difference between the target reference pixel point and adjacent reference pixel points thereof is used to distinguish the real boundary, the strong step and the weak step, so as to adaptively select filters with different filtering grades thereof to filter the reference pixel points.

According to the embodiment, in the intra-frame prediction, a filter with a length of 5 or more is introduced as a strong filter, so that steps with large amplitude can be effectively removed.

The locally adaptive filtering mechanism used in this embodiment has increased flexibility of filtering, to calculate the local difference for each reference pixel point of the non-edge reference pixel points, and a more optimal filter is selected for each pixel point for filtering.

Embodiment 2

Figure 5:
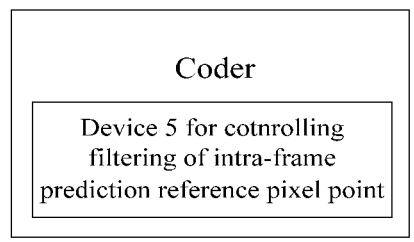
FIG. 5 is a schematic view of the structure of an encoder according to Embodiment 2 in the present invention.
Figure 6:
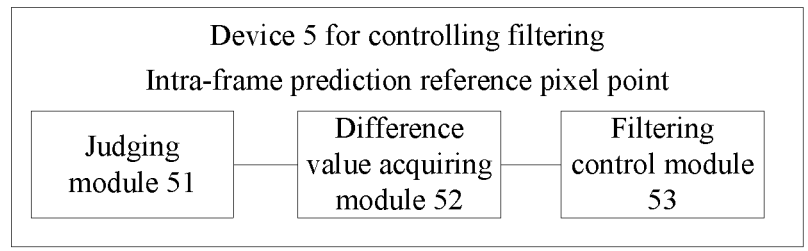
FIG. 6 is a schematic view of a device for controlling filtering of an intra-frame prediction reference pixel point according to Embodiment 2 in the present invention.

This embodiment provides an encoder, which may be used for video/image encoding, that is, a video/image encoder, as shown in FIG. 5, includes an intra-frame prediction reference pixel point filtering control device 5. Wherein, referring to FIG. 6, the device for controlling filtering of an intra-frame prediction reference pixel point includes:

A judging module 51 acquires target reference pixel point to be filtered currently in a reference pixel group of an intra-frame block to be predicted, and determines whether the target reference pixel point is an edge reference pixel point in a reference pixel group.

A difference value acquiring module 52 acquires a pixel difference value between the target reference pixel point and n adjacent reference pixel points thereof in a reference pixel group of an intra-frame block to be predicted, when the target reference pixel point to be filtered currently is not an edge reference pixel point in a reference pixel group, wherein n is greater than or equal to 1.

A filtering control module 53 selects a filter with the filtering grade thereof corresponding to the pixel difference value obtained in the difference value acquiring module 52 to filter the target reference pixel point.

A filtering control module 53 selects the first filtering grade when the pixel difference value is less than the preset threshold of the weak step pixel difference value, or when the pixel difference value is greater than the preset threshold of the strong step pixel difference value, wherein the filter with the first filtering grade has a length equal to 3;

When the pixel difference value is greater than or equal to the preset threshold of the weak step pixel difference value and less than or equal to the preset threshold of the strong step pixel difference value, the filter with the second filtering grade is selected; the filter with the second filtering grade has a length greater than or equal to 5.

A filtering control module 53 selects the filter in the same method as Embodiment 1, which will not be described here.

According to this embodiment, the filtering control module 53 can further process the target reference pixel point according to the filtering rule for edge reference pixel points when the target reference pixel point in the judging module 51 is an edge reference pixel point. Specifically, the filtering control module 53 does not filter the target reference pixel point when the target reference pixel point is an end edge reference pixel point. The filtering control module 53 can filter the target reference pixel point directly by selecting a filter with a preset filtering grade when the target reference pixel point is a secondary edge reference pixel point. The filter with the preset filtering grade herein is preferably a filter with weak filtering grade to remove the smaller step and noise in the reference pixel points. Further, the above filter with the first filtering grade can be used directly.

It should be understood that, according to this embodiment, the above functions of the judging module 51, the filtering control module 53 and the difference value acquiring module 52 may be implemented by a controller or a processor in an encoder. Furthermore, the judging module 51, the filtering control module 53 and the difference value acquiring module 52 may be implemented as a controller or a processor.

Figure 7:
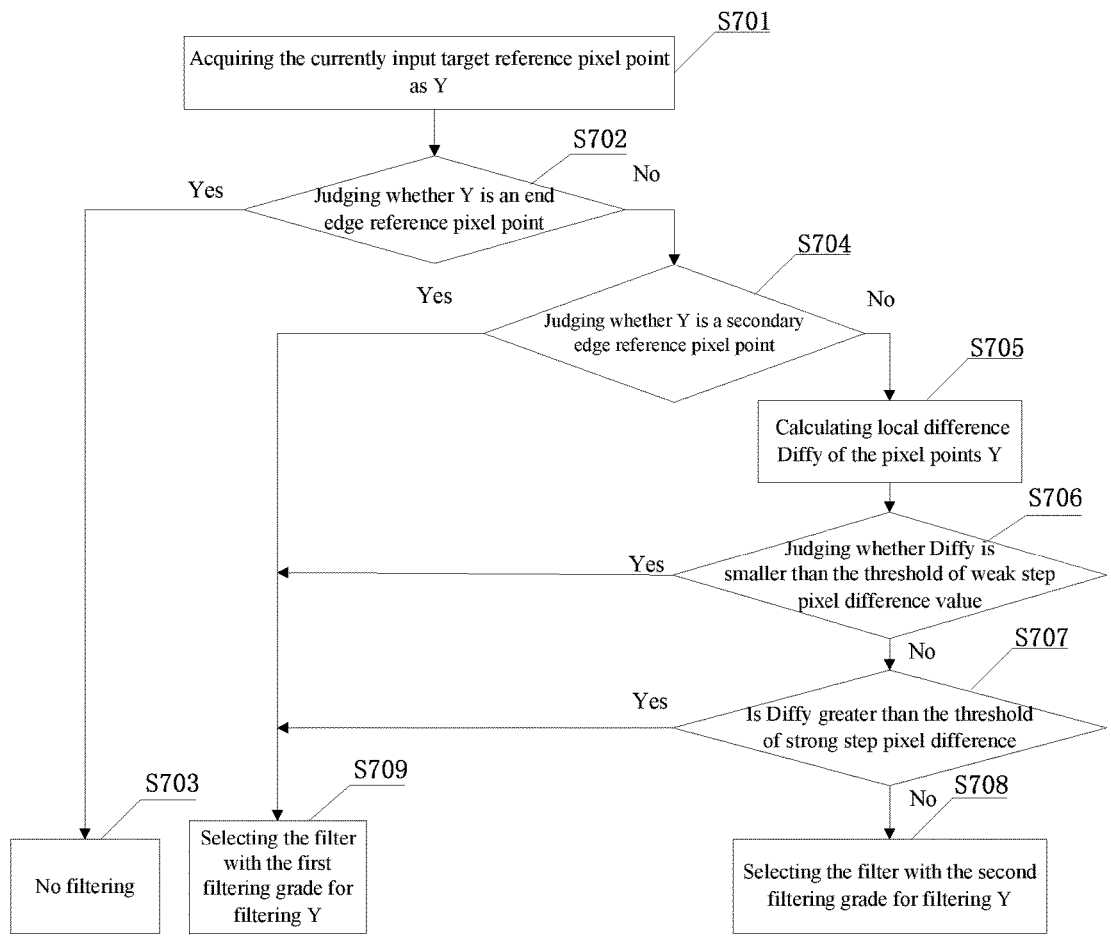
FIG. 7 is a flowchart for a method for controlling filtering of an intra-frame prediction reference pixel point according to Embodiment 2 in the present invention.

In order to better understand the present invention, according to this embodiment, the filter with the first filtering grade has a length equal to 3 and the filter coefficient of [¼, 2/4, ¼]; the filter with the second filtering grad has a length equal to 5 and the filter coefficient of [2/16, 3/16, 6/16, 3/16, 2/16]. Take the reference pixel group in FIG. 1 as an example for illustration. FIG. 7 illustrates a filtering control process that can include the following steps:

S701: acquiring the currently input target reference pixel point as Y;

S702: judging whether Y is an end edge reference pixel point (pixel points corresponding to the pixel value A, I and R in FIG. 1), and if yes, go to Step S703; otherwise, go to Step S704;

S703: no filtering;

S704: judging whether Y is a secondary edge reference pixel point (pixel points corresponding to the pixel value B, H, J and Q in FIG. 1), and if yes, go to Step S709; otherwise, go to Step S705;

S705: calculating the local difference Diffy of the pixel point Y;

S706: judging whether Diffy is smaller than the threshold of weak step pixel difference value, and if yes, go to Step S709; otherwise, go to Step S707;

S707: judging whether Diffy is greater than the threshold of strong step pixel difference value, and if yes, go to Step S709; otherwise, go to Step S708; and S708: selecting the filter with the second filtering grade for Y for filtering.

For example, assuming that Y is the pixel point with a pixel value N in FIG. 1, the pixel value N obtained after filtering by using a filter with the second filtering grade= (2*L/16+3*M/16+6*N/16+3*P/16+2*Q/16).

Compared with the filter with the first filtering grade with a filtering length of 3, according to this embodiment, the filter with the second filtering grade can provide greater filtering strength and remove stronger step effects between pixels. And further, the filter with the second filtering grade utilizes the current pixel point and more than 4 surrounding pixel points. Compared with the linear interpolation filter, the filter with the second filtering grade is more local and can reduce the drastic change to the reference pixel value.

S709: selecting the filter with the first filtering grade for Y for filtering.

For example, assuming that Y is the pixel point with a pixel value N in FIG. 1, the pixel value N obtained after filtering by using the filter with the first filtering grade=(M/4+2*N/4+P/4).

According to the embodiment, in the intra-frame encoding prediction process, the local difference characteristic of the pixel difference between the target reference pixel point and adjacent reference pixel points thereof is used to distinguish the real boundary, the strong step and the weak step, so as to adaptively select filters with different filtering grades thereof to filter the reference pixel points, increasing flexibility of filtering, to calculate the local difference for various non-edge reference pixel points, and a more optimal filter is selected for various pixel points.

It is understood by those skilled in the field that all or part of steps of various methods according to the embodiments may be programmed to instruct the associated hardware to achieve the goals, which may be stored in a readable storage medium of computer, e.g. read-only memory, random access memory, disk or CD.

The above contents are further detailed description of the present invention in connection with the disclosed embodiments. The invention is not limited to the embodiments referred to, but may be varied and modified by those skilled in the field without departing from the conception and scope of the present invention.

What is claimed is:

1. A method of controlling filtering intra-frame prediction reference pixel point, comprising:

in a reference pixel group of an intra-frame block to be predicted, acquiring a pixel difference value between a target reference pixel point and n adjacent reference pixel points thereof when the target reference pixel point to be filtered currently is not an edge reference pixel point in the reference pixel group, wherein n is greater than or equal to 1, wherein the step of acquiring a pixel difference value comprises:
obtaining a sum h1 of pixel values of the n pixel points;
obtaining a product h2 of n and a pixel value of the target reference pixel point; and
taking absolute value Diffy of the difference between the h1 and h2 as the pixel difference value; and selecting a filter with a filtering grade thereof corresponding to the pixel difference value to filter the target reference pixel point.

2. The method of claim 1, wherein when the target reference pixel point is an end edge reference pixel points in the reference pixel group, no filtering processing is performed on the target reference pixel point.

3. The method of claim 1, wherein n is equal to 2.

4. The method of claim 1, wherein the step of selecting a filter with a filtering grade comprises:
when the pixel difference value is less than a preset threshold of the weak step pixel difference value, or when the pixel difference value is greater than the preset threshold of the strong step pixel difference value, selecting the filter with a first filtering grade, wherein the filter with the first filtering grade has a length equal to 3; and
when the pixel difference value is greater than or equal to the preset threshold of the weak step pixel difference value and less than or equal to the preset threshold of the strong step pixel difference value, selecting the filter with a second filtering grade, wherein the filter with the second filtering grade has a length greater than or equal to 5.

5. The method of claim 4, wherein the filter with the second filtering grade has a length equal to 5 and a filter coefficient of [$2/16$, $3/16$, $6/16$, $3/16$, $2/16$].

6. The method of claim 4, wherein the filter with the first filtering grade is selected for filtering when the target reference pixel point is a secondary edge reference pixel point adjacent to an end edge reference pixel point in the reference pixel group.

7. A device for controlling filtering intra-frame prediction reference pixel point, comprising:
a difference value acquiring module configured to acquire a pixel difference value between a target reference pixel point and n adjacent reference pixel points thereof in a reference pixel group of an intra-frame block to be predicted, when the target reference pixel point to be filtered currently is not an edge reference pixel point in a reference pixel group, wherein the n is greater than or equal to 1,
wherein the difference value acquiring module is configured to:
obtain a sum h1 of pixel values of the n pixel points;
obtain a product h2 of n and a pixel value of the target reference pixel point;
and take absolute value Diffy of the difference between the h1 and h2 as the pixel difference value to acquire the pixel difference value; and
a filtering control module configured to select a filter with a filtering grade thereof corresponding to the pixel difference value to filter the target reference pixel point.

8. The device of claim 7, wherein the filtering control module is configured to select the filter with the first filtering grade when the pixel difference value is less than the preset threshold of the weak step pixel difference value, or when the pixel difference value is greater than the preset threshold of the strong step pixel difference value, wherein the filter with the first filtering grade has a length equal to 3,
wherein the filtering control module is configured to select the filter with the second filtering grade when the pixel difference value is greater than or equal to the preset threshold of the weak step pixel difference value and less than or equal to the preset threshold of the strong step pixel difference value, wherein the filter with the second filtering grade has a length greater than or equal to 5.

9. An encoder comprising the device for controlling filtering of an intra-frame prediction reference pixel point according to claim 7.

* * * * *